Feb. 6, 1962 M. A. LOGAN 3,020,479

ELECTRIC WAVE SYNCHRONIZATION

Filed Aug. 15, 1960 2 Sheets-Sheet 1

INVENTOR
M. A. LOGAN
BY J. P. Kearns, Jr.
ATTORNEY

Feb. 6, 1962 M. A. LOGAN 3,020,479

ELECTRIC WAVE SYNCHRONIZATION

Filed Aug. 15, 1960

2 Sheets-Sheet 2

INVENTOR
M. A. LOGAN
BY J. P. Kearns, Jr.
ATTORNEY

United States Patent Office 3,020,479
Patented Feb. 6, 1962

3,020,479
ELECTRIC WAVE SYNCHRONIZATION

Mason A. Logan, New Providence, N.J., assignor to Bell Telephone Laboratories, Incorporated, New York, N.Y., a corporation of New York Filed Aug. 15, 1960, Ser. No. 49,545
6 Claims. (Cl. 328—13)

This invention relates to synchronous data communications systems in general and specifically to the recovery of a synchronizing signal at the receiver in such a system.

In a copending application of Paul A. Baker, Serial No. 49,544, filed on August 15, 1960, a data communications system is disclosed in which binary on-off data signals are transmitted in bit pairs by a relative phase shift encoding of the transmitted carrier wave. Serial data are converted into bit pairs, or dibits as Baker styles them, which are effective to shift the start or epoch angle of the transmitted carrier wave during each signal interval by a multiple of 45 degrees with respect to the epoch angle of the previous dibit. The relative phase of one dibit, with respect to the previous dibit, constitutes the intelligence transmitted. An important feature of this data communications system is that at least a 45 degree phase shift is effected even in the case of repeated dibit pairs occurring in a message.

The receiver in the Baker system determines the successive carrier phase differences to demodulate the transmitted intelligence. Each data dibit measurement is made by product demodulators in the receiver. A delay line having a delay time of exactly one dibit period delivers to the demodulator the previous dibit at the same instant that the present dibit arrives. With both dibits present for comparison, the phase difference can readily be determined.

In order, however, to make the final determination of the state of the transmitted message, it is essential that the receiver know the exact interval during which each dibit is present. Timing or synchronizing pulses are therefore necessary to be certain that the sampling occurs at the proper instant for each dibit pair. Because the carrier phases of the successive dibits are never identical, synchronizing information can be made inherent in the intelligence signal by a proper choice of carrier frequency for a given dibit rate. No separate synchronizing signal need then be sent from the transmitter in addition to the message wave. Furthermore, no local flywheel oscillator or the like is required at the receiver.

It is an object of this invention to simplify the recovery of synchronizing signals in a phase-modulated data transmission system.

It is another object of this invention to recover a synchronizing signal directly from the phase transitions occurring in the phase-modulated carrier wave of a data transmission system.

It is still another object of this invention to recover a synchronizing signal from a phase-modulated carrier wave independently of the nature or randomness of the data coding.

It is yet another object of this invention to recover a synchronizing signal from a phase-modulated carrier wave even in the presence of a carrier frequency shift in the transmission system.

According to this invention, a synchronizing signal at the dibit rate is recovered from a constantly changing phase-modulated carrier wave in a simple manner relying on the realization that the ever changing transition angle between successive coded dibit signal elements produces two principal sidebands. Although these sidebands are different for each dibit combination, are unsymmetrically placed with respect to the carrier frequency, and are unlike in amplitude; nevertheless the difference in frequency, I have discovered, is always exactly equal to the dibit frequency. Using repeated dibits, for example, the principal sideband pairs differ in frequency, one set peculiar to each of the four possible codes that can be sent, but the difference frequency and phase angle are invariant. It is to be noted, however, that a random succession of dibits produces a continuous spectrum over a long time interval, but the difference frequency existing during each dibit interval is constant.

The received line signal is separated by a high-pass and a low-pass filter, crossing at the carrier frequency, into two parts. These two parts are applied to a double balanced modulator which suppresses both input sidebands and delivers an output which includes the sum and difference of the input signals. The difference frequency is the dibit, or synchronizing, frequency desired and can be readily selected by a tuned circuit from the demodulator output. The phase angle and frequency difference between the sideband pairs is unaffected by the nature of the code, even though the amplitudes of the sideband pairs are strongly code sensitive. A simple fixed phase shifter circuit following the tuned circuit suffices to place the recovered synchronizing signal at the exact sampling instant required and compensates for unavoidable differences in phase shift in the high- and low-pass filters.

The synchronization recovery system of this invention has the following important advantages over recovery systems of the prior art: the difference frequency between the transmitted sidebands is immune to frequency shift introduced in the transmission line, such as in a voice frequency telephone line; the presence of the difference frequency in the transmitted line signal cannot be affected by the nature of the data coding whether random or repeated; and a minimum length of start coding at the beginning of a full message suffices to place the synchronization recovery system into operation. The only necessary restriction on the transmitted message imposed by this system is that a transition phase angle between the end of one dibit interval and the start of the next dibit interval be preserved. In order to insure the presence of such a transition angle, it is only necessary that the ratio of carrier frequency to dibit transmission rate be as any integer to the number four.

The objects and advantages of this invention will be more readily appreciated from a consideration of the following detailed description and the drawings, in which.

In a representative phase-modulation system, such as is disclosed in the above-mentioned Baker application, after a few random dibits have been transmitted as a start signal, the phase of the last random dibit becomes the reference element of carrier frequency for the first message dibit. The first message dibit comprises another signal element of the same carrier frequency but altered in phase with respect to that of the previous element by an odd integral number of $\pi/4$ radians (45 degrees), i.e., $\pi/4$, $3\pi/4$, $5\pi/4$ or $7\pi/4$. Succeeding message dibits use the phase of the immediately preceding dibit as their reference. The phase angle between the starts of successive elements may be referred to as the epoch angle. The purpose of this particular choice is always to introduce a phase change between successive dibits, even in the condition of repeated space-space dibit pairs, for example. It will be understood that the word "element"

is used for convenience to describe successive equal intervals of carrier without implying that any absence of carrier frequency exists between successive elements.

There is another consideration besides that of preserving a distinct epoch angle in the signal coding that is essential in order to insure a distinct transition phase shift between each successive signal. A change in phase between the end of one dibit and the beginning of the next dibit must obtain as well as a change in phase between the starts of successive dibits. Otherwise, with some signal combinations, although there is a relative change of phase between the start of successive signal bursts, there may not be any change of phase from the end of one dibit to the beginning of the following dibit. This latter change of phase, referred to as the transition angle, is necessary to the creation of the sidebands from which the synchronization signal is recovered. In order to insure this necessary condition, the carrier frequency is chosen as an integral number of quarters times the dibit message rate. For example, for a serial bit rate of 2000 per second, the dibit rate is 1000 per second and the carrier frequency can only be 1500, 1750, 2000 or the like, cycles per second. Carrier frequencies of 1500, 1750 and 2000 cycles per second thus are with respect to the dibit rate of 1000 in the ratios of 6/4, 7/4 and 8/4. For the embodiment described by Baker, a carrier frequency of 1750 cycles per second, or one and three-quarters times the dibit frequency, was chosen. In the description of this invention this carrier frequency is assumed, although the principles involved are equally applicable to the use of other permissible frequencies.

Figure 2:
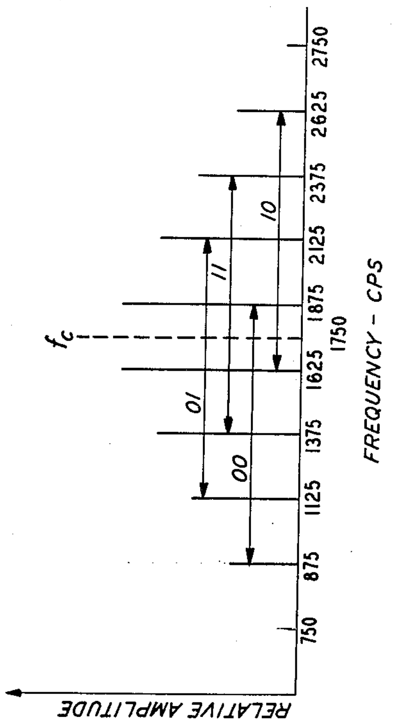
FIG. 2 is a frequency spectrum of sidebands obtained from repeated signal combinations in a phase-modulated data transmission system.

I have found that the frequency spectrum obtained with a continuously phase-shifted carrier signal such as obtains in the Baker apparatus is of the type shown in FIG. 2. This figure is a frequency plot of dominant frequencies present in the received signal with relative amplitudes shown for repeated dibit combinations 00, 10, 01 and 11. The carrier frequency $f_c$=1750 cycles per second as shown by the center dotted line is suppressed by the phase coding in the transmitter, except for some successive code combinations which alternately cycle the phase between a fixed advance and an equal retardation. The possibility of such an occurrence need not concern us, as the sidebands then become symmetrical and of equal amplitude, thereby facilitating operation. The first zeros of the spectrum occur at the carrier frequency plus and minus the dibit frequency, namely: 1750+1000=2750 and 1750−1000=750 cycles per second. The location of these frequencies is shown at the ends of the diagram. Spectrum frequencies lying beyond these two zeros are suppressed in the transmitting line filters.

Transition phase changes in the carrier frequency occur at the dibit rate and the principal frequencies occurring when repeating each of the four possible dibit combinations 00, 01, 10 and 11 are plotted as solid vertical lines in FIG. 2. As previously mentioned, the spectrum appears continuous for a random data message. Of the two sidebands generated for each dibit combination one predominates over, i.e., is of greater amplitude than, the other. For example, for the repeated combination 01 (space-mark) the principal frequencies are 2125 (dominant) and 1125 cycles per second. Similarly, for the repeated combination 11 (mark-mark), the sidebands occur concurrently at 1375 and 2375 cycles per second. The remaining pairs are 875 and 1875 cycles per second for the repeated combination 00 (space-space) and 1625 and 2625 cycles per second for the repeated combination 10 (mark-space). In each case the difference frequency is 1000 cycles per second, or the dibit frequency. For a random message the sideband pairs occurring simultaneously in any dibit interval have the difference frequency of 1000 cycles per second. It should be borne in mind that for other carrier frequencies, different sideband pairs associated with each dibit combination would be obtained, but there will always be exactly four distinct sets.

Since the difference frequency between concurrent sidebands is always the dibit frequency, it is only necessary to separate the upper sidebands from the lower sidebands and to intermodulate them to obtain the difference frequency. Even though the respective sideband pairs are not of equal amplitude, nevertheless a difference frequency of satisfactory amplitude can be obtained in all cases. Should the over-all spectrum of the received signal be shifted with respect to the transmitted signal in a non-synchronous telephone carrier system, for example, both sidebands of a pair would be shifted equally, and the difference frequency would be unaffected.

Figure 1:
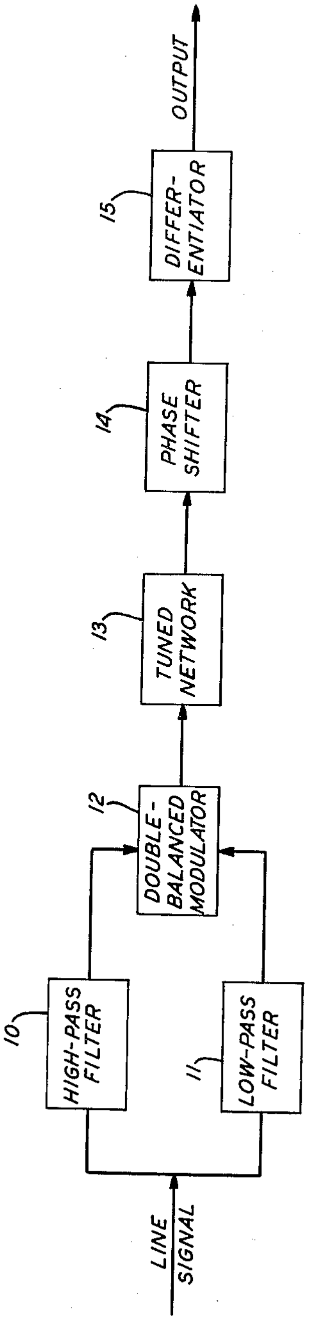
FIG. 1 is a block diagram of a synchronization recovery system according to this invention.

FIG. 1 is a block diagram of a synchronizing signal recovery system according to this invention. The phase-modulated carrier line signal is received at the left and is fed in parallel to the input of high- and low-pass filters 10 and 11 as shown. These filters may be of any conventional design. It is only necessary that the difference in phase shift between each of the four pairs of sideband frequencies be substantially constant. High-pass filter 10 must have a lower cut-off above the carrier frequency. If noise arising outside the transmission band or the problem of meeting the differential phase-shift requirement with respect to the low-pass and high-pass filters should be troublesome, high-pass filter 10 may be replaced by a bandpass filter having a lower cut-off just above the carrier frequency and an upper cut-off just above the carrier frequency plus the dibit rate, in this case just above 2750 cycles per second. The low-pass filter 11 is also of conventional design and has an upper cut-off frequency just below the carrier frequency. The two filters 10 and 11 effectively separate the sideband pairs and further suppress the carrier frequency $f_c$, if any is present due to an unusual coding sequence.

The modulator 12 shown in FIG. 1 may be any suitable type of modulator. A ring modulator using matched dry rectifiers is appropriate because operation is best in this type of modulator when the two input signals are of different amplitudes.

In the output of the modulator 12 there are obtained the sum and difference frequencies of the upper and lower sidebands. These frequencies are impressed on tuned network 13 as shown. Since the network is tuned to 1000 cycles per second, only the difference frequency appears in the output.

Due to delay, or phase angle, distortion in the filters 10 and 11 the zero-crossings of the recovered 1000-cycle wave may be out of phase with respect to the message signal to be sampled. Therefore, a conventional phase shifter 14 is used for an initial adjustment and then locked in order to compensate for any permanent and unavoidable relative phase shift in the low- and high-pass filters for the different sideband pairs. The squarer and differentiator 15 converts the sine-wave output of network 13 to sampling pulses useful in the demodulators of a data receiver such as is described in the Baker disclosure.

Figure 3:
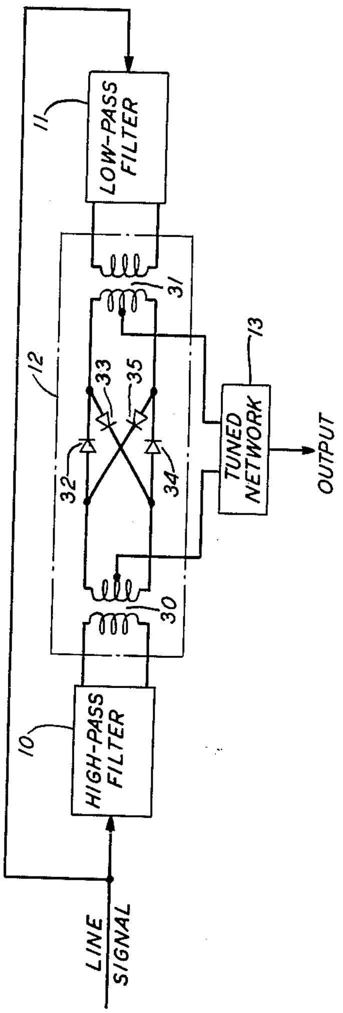
FIG. 3 is a circuit diagram of an illustrative embodiment of this invention using a ring modulator.

FIG. 3 is a schematic diagram of an illustrative embodiment of a synchronization recovery circuit according to this invention. FIG. 3 shows high-pass filter 10, a low-pass filter 11 and a tuned network 13 as diagrammed in FIG. 1. Block 12 of FIG. 1, however, is replaced by a double-balanced ring modulator employing center-tapped transformers 30 and 31 and four dry rectifiers 32, 33, 34 and 35. The rectifiers may be copper oxide, germanium or silicon unilaterally conducting devices. Preferably they are balanced with respect to each other to avoid leakage of the input signals into the output. The line signal including the sideband pairs due to the message signal encoding is applied alike to the inputs of the high-pass and low-pass filters. The output of the high-pass filter connects to the primary side of transformer 30. The output of the low-pass filter connects to the primary winding of transformer 31. The dry rectifiers are arranged in a lattice network anode to cathode. The devices 32 and 34 are directly connected between the upper ends and lower ends, respectively, of the secondary windings of transformers 30 and 31. The remaining devices 33 and 35 are cross-connected between the lower end of the secondary winding of transformer 31 and the upper end of the secondary winding of transformer 30 and vice versa. The center-tap connection of both transformers leads to the input of the tuned network 13.

The operation of the ring modulator is well known. Whichever of the upper or lower sidebands from the outputs of the filters 10 and 11 is greater in amplitude controls the switching action of the diodes. When the high-frequency sideband predominates, diodes 32 and 35 in series and diodes 33 and 34 in series are alternately forward- and back-biased in pairs. Signals on the upper and lower halves of the secondary winding of transformer 31 are thereby alternately switched to the center-tap output connection on transformer 30 at a high-frequency rate. Conversely, when the low-frequency sideband predominates, diodes 35 and 34 and diodes 33 and 32 are alternately forward- and back-biased in pairs to switch the high-frequency signal to the center-tap output connection on transformer 31 at a low-frequency rate. Because the lattice elements are balanced, neither the upper nor lower sideband frequency appears on the output leads. Only the sum and difference frequencies appear. Tuned network 13 selects the difference frequency and blocks the sum frequency. The double balanced rectifier bridge is advantageous because only passive circuit elements are employed, and only the lower amplitude modulation product is transmitted to the filter, thereby resulting in a reduced signal amplitude range applied to the filter.

Figure 4:
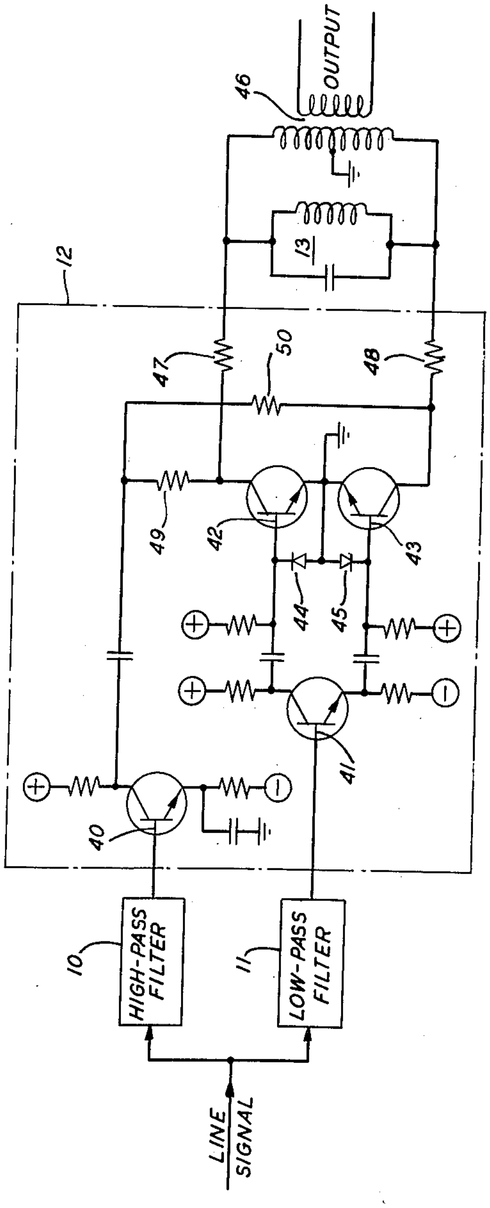
FIG. 4 is a circuit diagram of an illustrative embodiment of this invention using transmission gates.

FIG. 4 is a schematic diagram of another illustrative embodiment of a synchronization recovery circuit according to this invention. Four n-p-n junction-type transistors are used in the circuit to perform the functions of amplification, phase splitting and modulation as inherent in the operation of modulator 12 in FIG. 1. The output of the high-pass filter 10, which is the same as the one similarly designated in FIG. 1, is applied to the base electrode of amplifying transistor 40. The collector and emitter electrodes are connected through resistors as shown, respectively, to positive and negative voltage sources. The amplified output is taken from the collector through a coupling capacitor. The output of the low-pass filter 11, designated as in FIG. 1, is applied to the base of transistor 41 which has its collector and emitter electrodes connected through resistors to positive and negative voltage sources. Two outputs are obtained from the collector and emitter electrodes, respectively. Since a signal applied to the base electrode causes the collector voltage to fall at the same time the emitter voltage rises, the respective output signals are reversed in phase with respect to each other. It is apparent that the embodiment of FIG. 4 will operate as well when the positions of the high- and low-pass filters are interchanged.

The signal at the collector of transistor 41 is applied through a coupling capacitor to the base of transistor 42. Similarly the signal at the emitter of transistor 41 is coupled through another capacitor to the base of another transistor 43. Transistors 42 and 43 constitute transmission gates and are normally biased into saturation by reason of the connection of the base electrodes to a positive potential source. Across the base-emitter junctions of transistors 42 and 43 are connected diodes 44 and 45, respectively. These diodes are unilaterally conducting devices which are poled for easy conduction away from ground. The emitters of transistors 42 and 43 are also returned to ground. The base electrodes of transistors 42 and 43 and the cathodes of diodes 44 and 45 are returned by way of resistors to a positive voltage source. The diodes are thus back-biased and the transistors are forward-biased. The high-frequency output of transistor 40 is applied through resistors 49 and 50 to the collector electrodes of transistors 42 and 43 and also to opposite terminals of 1000-cycle tuned network 13, which may comprise a capacitor and an inductor as shown. Since the output of transistor 40 is shunted to ground by transistors 42 and 43 in their normal state, none of it reaches network 13 in the absence of negative signals from transistor 41. Negative half-cycles of the output of transistor 41 are effective to allow transistors 42 and 43 to turn off. Negative half-cycles are effective also to forward bias diodes 44 and 45 and to back bias transistors 42 and 43. Since the positive and negative half-cycles of phase split outputs of transistors 41 are 180 degrees out of phase with each other, transistors 42 and 43 are alternately on and off. Therefore, the high-frequency signal is coupled to first one terminal and then the other of tuned network 13 at a low-frequency rate in the manner of a single-pole double-throw switch effectively producing therein a 1000-cycle difference frequency. Resistors 47 and 48 connected between the collector electrodes of transistors 42 and 43 and the opposite terminals of tuned network 13 are used to isolate the network therefrom in order to prevent its being shorted to ground by the closed gates. The 1000-cycle output is taken from tuned network 13 through a conventional output transformer 46 having a primary winding with a grounded center tap and secondary windings as shown. The phase shifter shown in FIG. 1 is not shown in FIG. 3. However, it is used for the purpose previously mentioned in a practical recovery system.

While in the foregoing description the application of the invention has been related to a particular data transmission system, it is apparent to one skilled in the art that the invention has a wider application, for example, to a phase-modulated system in which multiples of 90 degrees are used. In the latter case, in order to insure a transition angle, the carrier frequency must be related to the dibit frequency by the ratio of any odd integer to the number eight.

What is claimed is:

1. In a data transmission system in which digital information is transmitted as predetermined phase shifts of a carrier frequency for each successive data element, an arrangement for recovering from the received signal a synchronization wave comprising a high-pass filter having its low frequency cut off just above said carrier frequency, a low-pass filter having its high frequency cut off just below the carrier frequency, means for applying the received wave to the inputs of both of said filters, modulating means connected to the outputs of said filters whereby said two outputs are intermodulated to produce sum and difference frequencies thereof, and a bandpass filter connected to the output of said modulating means for selecting said difference frequency, said difference frequency constituting said synchronization wave.

2. The arrangement for recovering a synchronization wave as defined in claim 1 in which said modulating means comprises means for splitting the output of either of said low-pass or high-pass filters into components of opposite phase, a pair of transmission gates each of which is controlled by one of the components in the output of said splitting means whereby said gates are alternately enabled and disabled, means for connecting identical phases of the output of the other of said low-pass or high-pass filters to said transmission gates and to said bandpass filter, whereby the output of the other of said filters is alternately directed to one and the other terminal of said bandpass filter.

3. The arrangement for recovering a synchronization wave as defined in claim 1 in which said modulating means comprises a double-balanced modulator in whose output neither input frequency appears.

4. The arrangement for recovering a synchronization wave as defined in claim 1 in which said modulating means comprises first and second transformers each having a primary winding and a secondary winding with a center-tap connection, a lattice network having four terminals and including a first pair of unilaterally conducting devices oppositely poled and interconnecting a first lattice terminal with a second and third terminal and a second pair of unilaterally conducting devices oppositely poled and interconnecting a fourth lattice terminal also with the second and third terminals, means for connecting the secondary winding of said first transformer to said first and fourth lattice terminals, further means for connecting the secondary winding of said second transformer to said second and third lattice terminals, means for coupling the output of said high-pass filter to the primary winding of said first transformer, further means for coupling the output of said low-pass filter to the primary winding of said second transformer, and means for joining the center-tap connections of said first and second transformers to said bandpass filter.

5. In a receiver for a data communication system in which successive message signals are encoded at a synchronous rate as the relative phase difference between successive signal elements of a carrier wave and in which each carrier phase change produces a unique pair of sidebands having a difference frequency equal to said synchronous rate, an arrangement for recovering a synchronizing signal from said message signal comprising filter means for separating from each other the upper and lower frequencies of each sideband pair, means for intermodulating the separated upper and lower frequencies to obtain sum and difference modulation products thereof, and further filter means for selecting the difference frequency from the modulation products in the output of said intermodulating means.

6. In combination, a source of synchronously phase-shifted electromagnetic waves of a given frequency, each wave being composed of a succession of sideband pairs having a difference frequency equal to the synchronous rate at which said waves are generated, a first filter having a pass-band lying above said given frequency, a second filter having a pass-band lying below said given frequency, means for applying waves from said source to said first and second filters, modulating means producing sum and difference modulation products of its input frequencies, means for impressing the outputs of said filters on said modulating means, a third filter having a narrow pass-band centered on said difference frequency, means for connecting the output of said modulating means to said third filter, and a phase-shifting network in tandem with said third filter for adjusting the phase of the difference frequency output of said third filter to render it useful in sampling a message wave transmitted at said synchronous rate.

References Cited in the file of this patent

UNITED STATES PATENTS

| | | |
|---|---|---|
| 2,593,695 | Peterson | Apr. 22, 1952 |
| 2,612,633 | Cutler | Sept. 30, 1952 |